United States Patent
Kwak et al.

(10) Patent No.: US 9,515,297 B2
(45) Date of Patent: Dec. 6, 2016

(54) RECHARGEABLE BATTERY

(71) Applicant: SAMSUNG SDI CO., LTD., Yongin-si, Gyeonggi-do (KR)

(72) Inventors: Yoon-Tai Kwak, Yongin-si (KR); Yup Hwangbo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 182 days.

(21) Appl. No.: 14/166,693

(22) Filed: Jan. 28, 2014

(65) Prior Publication Data

US 2015/0024260 A1 Jan. 22, 2015

Related U.S. Application Data (60) Provisional application No. 61/856,269, filed on Jul. 19, 2013.

(51) Int. Cl.
  *H01M 2/02* (2006.01)
  *H01M 2/04* (2006.01)

(52) U.S. Cl.
  CPC ............. *H01M 2/02* (2013.01); *H01M 2/0217* (2013.01); *H01M 2/04* (2013.01); *H01M 2/0426* (2013.01); *H01M 2/0439* (2013.01); *H01M 2/0456* (2013.01); *H01M 2/0473* (2013.01)

(58) Field of Classification Search
  CPC ........ H01M 2/02; H01M 2/0217; H01M 2/04; H01M 2/0426; H01M 2/0439; H01M 2/0456; H01M 2/0473
  See application file for complete search history.

(56) References Cited

U.S. PATENT DOCUMENTS

2011/0064996 A1   3/2011   Park

FOREIGN PATENT DOCUMENTS

| EP | 2 175 506 A2 | 4/2010 |
|----|--------------|--------|
| JP | 10-144268 | 5/1998 |
| JP | 2001-155698 A | 6/2001 |
| JP | 2004-195490 | 7/2004 |
| JP | 2011-181215 | 9/2011 |
| KR | 2000-0069844 | 11/2000 |
| KR | 10-2007-0092696 | 9/2007 |

OTHER PUBLICATIONS

EPO Search Report dated Feb. 24, 2015, for corresponding European Patent application 14153791.0, (3 pages).
Patent Abstracts of Japan, and English machine translation of Japanese Publication 10-144268 dated May 29, 1998, listed above, (9 pages).

(Continued)

*Primary Examiner* — Ula C Ruddock
*Assistant Examiner* — Thomas Parsons
(74) *Attorney, Agent, or Firm* — Lewis Roca Rothgerber Christie LLP (57) ABSTRACT

A rechargeable battery unit includes an electrode assembly having a first electrode, a second electrode, and a separator between the first electrode and the second electrode. The rechargeable battery unit also includes a case accommodating the electrode assembly. The case includes an opening in a first end of the case and at least one groove in the first end of the case. The rechargeable battery unit also includes a cap plate coupled to the first end of the case. The cap plate includes at least one protrusion received in the at least one groove in the case.

14 Claims, 11 Drawing Sheets

(56) References Cited

OTHER PUBLICATIONS

Patent Abstracts of Japan, and English machine translation of Japanese Publication 2004-195490 dated Jul. 15, 2004, listed above, (14 pages).
Patent Abstracts of Japan, and English machine translation of Japanese Publication 2011-181215 dated Sep. 15, 2011, listed above, (17 pages).
EPO Office Action dated Oct. 6, 2016, for corresponding European Patent Application No. 14153791.0 (4 pages).

RECHARGEABLE BATTERY

CROSS-REFERENCE TO RELATED APPLICATION

This application claims priority to and the benefit of U.S. Provisional application No. 61/856,269, filed on Jul. 19, 2013, the entire content of which is hereby incorporated by reference.

BACKGROUND

1. Field

The present description relates generally to a rechargeable battery and, more particularly, to a rechargeable battery having a cap plate coupled to a case.

2. Description of the Related Art

Unlike a primary battery, a rechargeable battery is a battery configured to repeatedly perform charging and discharging. A rechargeable battery having a small capacity may be used in a portable small electronic device such as a mobile phone, a laptop computer, and a camcorder. A rechargeable battery having a large capacity may be used, for example, as a power source for driving a motor of hybrid and electric vehicles.

A rechargeable battery commonly includes an electrode assembly for performing charging and discharging, a case receiving the electrode assembly and an electrolyte solution, a cap plate fastened to an opening of the case, and an electrode terminal provided in the cap plate and electrically connected to the electrode assembly.

Conventionally, the case is formed by a deep draw process. Additionally, during the deep draw process, a step is formed at a position around the opening of the case. The step is configured to ensure alignment between the cap plate and the case when the cap plate is coupled to the case. Additionally, the cap plate is conventionally mated to the case by a press process.

However, a shape of the step in the opening may be non-uniform due to a technical limit in deep drawing. In that case, the cap plate is difficult to be seated in the opening and the step of the case, and may be over-inserted into the opening.

The above information disclosed in this Background section is only for enhancement of understanding of the background of the described technology and therefore it may contain information that does not form the prior art.

SUMMARY

The described technology has been made in an effort to provide a rechargeable battery in which when a cap plate is coupled with a case, safe seating of the cap plate in an opening of the case is achieved and over-insertion of the cap plate is prevented.

In one embodiment, the rechargeable battery unit includes an electrode assembly having a first electrode, a second electrode, and a separator between the first electrode and the second electrode. The rechargeable battery unit also includes a case accommodating the electrode assembly. The case includes an opening in a first end of the case and at least one groove in the first end of the case. The rechargeable battery unit also includes a cap plate coupled to the first end of the case. The cap plate includes at least one protrusion received in the at least one groove in the case.

The cap plate may include two shorter sides and two longer sides. The cap plate may be rectangular or trapezoidal. The at least one protrusion may extend from at least one of the two shorter sides of the cap plate. The at least one protrusion may extend from at least one of the two longer sides of the cap plate. A length of the at least one protrusion may be less than a thickness of the at least one groove. A thickness of the at least one protrusion may be substantially equal to a depth of the at least one groove such that an outer surface of the cap plate is substantially level with the first end of the case. The at least one protrusion may have a rectangular cross-section.

The at least one protrusion may taper between a thicker inner portion and a thinner outer portion. The rechargeable battery unit may include a plurality of protrusions extending from one edge of the cap plate and a plurality of grooves in the first end of the case, wherein each one of the plurality of protrusions in the cap plate is received in a respective one of the plurality of grooves in the case.

A first end and a second end of the cap plate may be asymmetric with respect to each other. A first portion of the case coupled to the first end of the cap plate and a second portion of the case coupled to the second end of the cap plate may be asymmetric with respect to each other.

The rechargeable battery unit may also include a weld bead coupling the cap plate to the case. The weld bead may include a first weld bead extending along the at least one groove and the at least one protrusion, and a second weld bead extending along a remainder of a joint between the cap plate and the case. The weld bead may extend continuously around a circumference of the cap plate. A width of the first weld bead may be greater than a width of the second weld bead. The first weld bead may include a portion of the at least one protrusion on the cap plate.

The rechargeable battery unit may also include a first electrode terminal coupled to the cap plate and electrically coupled to the first electrode and a second electrode terminal coupled to the cap plate and electrically coupled to the second electrode. The cap plate may also include a vent hole and a vent plate covering the vent hole.

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In describing the present invention, parts that are not related to the description will be omitted from the drawings. Like reference numerals generally designate like elements throughout the specification.

Figure 1:
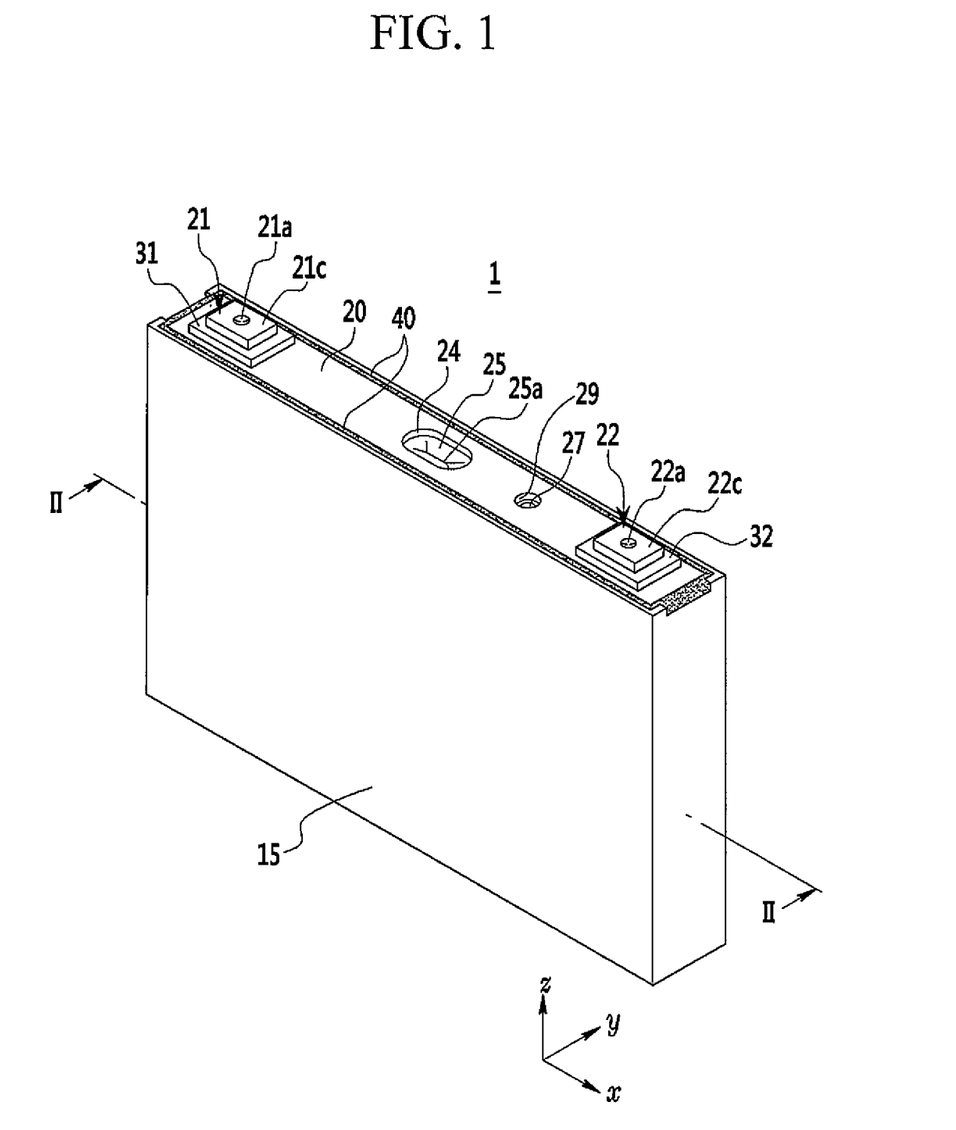
FIG. 1 is a perspective view of a rechargeable battery according to a first exemplary embodiment of the present invention.
Figure 2:
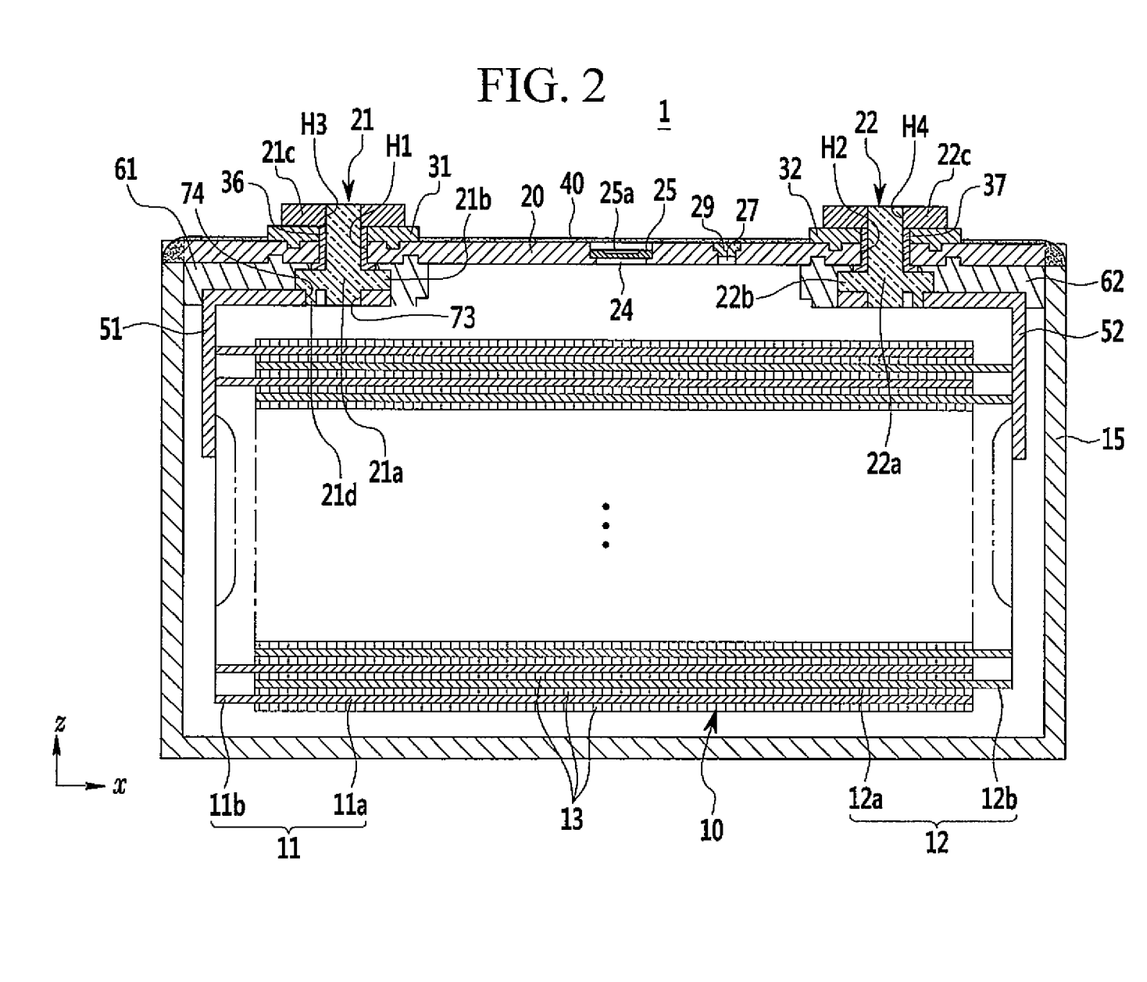
FIG. 2 is a cross-sectional view taken along the line II-II of FIG. 1.

FIG. 1 is a perspective view of a rechargeable battery according to a first exemplary embodiment of the present invention. FIG. 2 is a cross-sectional view taken along the line II-II of FIG. 1. Referring to FIGS. 1 and 2, a rechargeable battery 1 according to the first exemplary embodiment includes an electrode assembly 10 for charging and discharging a current, a case 15 receiving the electrode assembly 10 and an electrolyte solution, a cap plate 20 coupled to an opening of the case 15, a weld bead 40 formed along a joint between an internal circumference of the case 15 and an external circumference of the cap plate 20, and electrode terminals 21 and 22 provided on the cap plate 20.

In one embodiment, the electrode assembly 10 is formed by placing electrodes (for example, a negative electrode 11 and a positive electrode 12) on opposite sides of a separator 13 that is an insulator and winding the negative electrode 11, the separator 13, and the positive electrode 12 into a jelly roll state.

The negative and positive electrodes 11 and 12 include coated regions 11a and 12a, respectively, in which an active material is applied on a current collector of a metal plate, and uncoated regions 11b and 12b, respectively, formed from the portion of the current collector which is exposed and not coated with the active material.

The uncoated region 11b of the negative electrode 11 is formed at an end of the negative electrode 11 along the wound negative electrode 11. The uncoated region 12b of the positive electrode 12 is formed at an end of the positive electrode 12 along the wound positive electrode 12. In addition, the uncoated regions 11b and 12b are disposed at both ends of the electrode assembly 10.

In the illustrated embodiment, the case 15 has a shape of an approximate cuboid so as to form an internal space for receiving the electrode assembly 10 therein. Additionally, in the illustrated embodiment, the opening of the case 15 is formed to have a shape of a rectangle in a side of the cuboid to allow the electrode assembly 10 to be inserted from the outside into the internal space. In one or more alternate embodiment, the case 15 may have any other suitable shape, such as, for instance, a cylinder or a prism. Additionally, the opening in the case 15 may have any other suitable shape for receiving the electrode assembly 10, such as, for instance, circular.

In the illustrated embodiment, the cap plate 20 has the shape of a rectangle corresponding to the shape of the opening in the case 15 so that the cap plate 20 may be inserted in the opening of the case 15 to seal the case 15. For example, the case 15 and the cap plate 20 may be formed of aluminum and welded to each other. That is, after the electrode assembly 10 is inserted into the case 15, the cap plate 20 may be welded to the opening of the case 15.

Further, the cap plate 20 has one or more openings, for example, terminal holes H1 and H2, an electrolyte injection opening 27, and a vent hole 24. The electrode terminals 21 and 22 are provided in the terminal holes H1 and H2 of the cap plate 20, respectively, and are configured to be electrically connected to the electrode assembly 10.

That is, the electrode terminals 21 and 22 are electrically connected to the negative electrode 11 and the positive electrode 12 of the electrode assembly 10, respectively. Accordingly, the electrical charge from the electrode assembly 10 may be drawn out to the outside of the case 15 through the electrode terminals 21 and 22.

The electrode terminals 21 and 22 include plate terminals 21c and 22c, respectively, on the outside of the cap plate 20 that correspond to the respective terminal holes H1 and H2, and rivet terminals 21a and 22a electrically connected to the electrode assembly 10 and fastened to the plate terminals 21c and 22c, respectively, through the respective terminal holes H1 and H2.

The plate terminals 21c and 22c have through-holes H3 and H4, respectively. The rivet terminals 21a and 22a are inserted into the through-holes H3 and H4, respectively, in the respective plate terminals 21c and 22c, and through the terminal holes H1 and H2, respectively, in the cap plate 20. The electrode terminals 21 and 22 further include flanges 21b and 22b, respectively, integrated with inner ends of the rivet terminals 21a and 22a that extend into the case 15 through the terminal holes H1 and H2 in the cap plate 20.

In the embodiment illustrated in FIG. 2, the the electrode terminal 21, which is connected to the negative electrode 11, further includes an external insulation member 31 interposed between the plate terminal 21c and the cap plate 20. The external insulation member 31 electrically insulates the plate terminal 21c from the cap plate 20. That is, a state where the cap plate 20 is electrically insulated from the electrode assembly 10 and the negative electrode 11 is maintained by the insulation member 31.

The insulation member 31 and the plate terminal 21c are coupled together with an upper end of the rivet terminal 21a. The upper end of the rivet terminal 21a is deformed or welded to fasten the insulation member 31 and the plate terminal 21c to the upper end of the rivet terminal 21a. The plate terminal 21c is provided on an external side of the cap plate 20 and the insulation member 31 is interposed therebetween.

In the embodiment illustrated in FIG. 2, the electrode terminal 22, which is connected to the positive electrode 12, further includes a conductive top plate 32 interposed between the plate terminal 22c and the cap plate 20. The top plate 32 electrically connects the plate terminal 22c and the cap plate 20. In other words, a state where the cap plate 20 is electrically connected to the electrode assembly 10 and the positive electrode 12 is maintained by the top plate 32.

The top plate 32 and the plate terminal 22c are coupled together with the upper end of the rivet terminal 22a. The upper end of the rivet terminal 22a is deformed or welded to fasten the top plate 32 and the plate terminal 22c to the upper end of the rivet terminal 22a. The plate terminal 22c is provided on the external side of the cap plate 20 and the top plate 32 is interposed therebetween.

In the illustrated embodiment, gaskets 36 and 37 are provided between the rivet terminals 21a and 22a of the electrode terminals 21 and 22, respectively, and internal surfaces of the terminal holes H1 and H2 of the cap plate 20. The gaskets 36 and 37 are configured to create a liquid-tight seal between the rivet terminals 21a and 22a and the cap plate 20 and to electrically insulate the rivet terminals 21a and 22a from the cap plate 20.

In the illustrated embodiment, the gaskets 36 and 37 further extend between the flanges 21b and 22b and the internal surface of the cap plate 20 to create a liquid-tight seal between the flanges 21b and 22b and the cap plate 20 and to electrically insulate the flanges 21b and 22b from the cap plate 20. In other words, the gaskets 36 and 37 prevent leakage of the electrolyte solution through the terminal holes H1 and H2 in the cap plate 20 when the electrode terminals 21 and 22 are provided in the cap plate 20.

Additionally, in the embodiment illustrated in FIG. 2, lead tabs 51 and 52 electrically connect the electrode terminals 21 and 22 to the negative and positive electrodes 11 and 12 of the electrode assembly 10, respectively. In one embodiment, upper ends of the lead tabs 51 and 52 are coupled (e.g., caulked) to lower ends of the rivet terminals 21a and 22a, respectively. Additionally, the upper ends of the lead tabs 51 and 52 are supported by the flanges 21b and 22b, respectively.

In the illustrated embodiment, insulation members 61 and 62 are provided between the lead tabs 51 and 52, respectively, and the cap plate 20 to electrically insulate the lead tabs 51 and 52 and the cap plate 20. Further, the insulation members 61 and 62 are coupled to an inner surface of the cap plate 20 and surround the lead tabs 51 and 52, the rivet terminals 21a and 22a, and the flanges 21b and 22b, respectively, thus stabilizing the connections between the lead tabs 51 and 52 and the electrode terminals 21 and 22, respectively, and the connections between the electrode terminals 21 and 22 and the cap plate 20.

The electrolyte solution may be injected through the electrolyte injection opening 27 into the case 15 after the cap plate 20 is coupled with the case 15. After the electrolyte solution is injected, the electrolyte injection opening 27 may be sealed by a sealing stopper 29.

The vent hole 24 in the cap plate 20 is sealed by a vent plate 25. The vent hole 24 is configured to vent or exhaust gas generated by the rechargeable battery 1 to reduce the internal pressure of the rechargeable battery 1. When the internal pressure of the rechargeable battery 1 reaches a predetermined pressure, the vent plate 25 is configured to rupture to uncover and open the vent hole 24. In the illustrated embodiment, the vent plate 25 has a notch 25a for inducing rupture of the vent plate 25 when the internal pressure of the rechargeable battery 1 reaches the predetermined pressure.

The rechargeable battery 1 of the first exemplary embodiment also includes a groove unit 71 in the case 15 and a protrusion unit 72 in the cap plate 20 configured to be received in the groove unit 71. Together, the groove unit 71 and the protrusion unit 72 are configured to facilitate safe seating of the cap plate 20 in the opening of the case 15 and prevent over-insertion of the cap plate 20 into the opening when the cap plate 20 is coupled to the opening of the case 15 (see FIG. 3).

Figure 3:
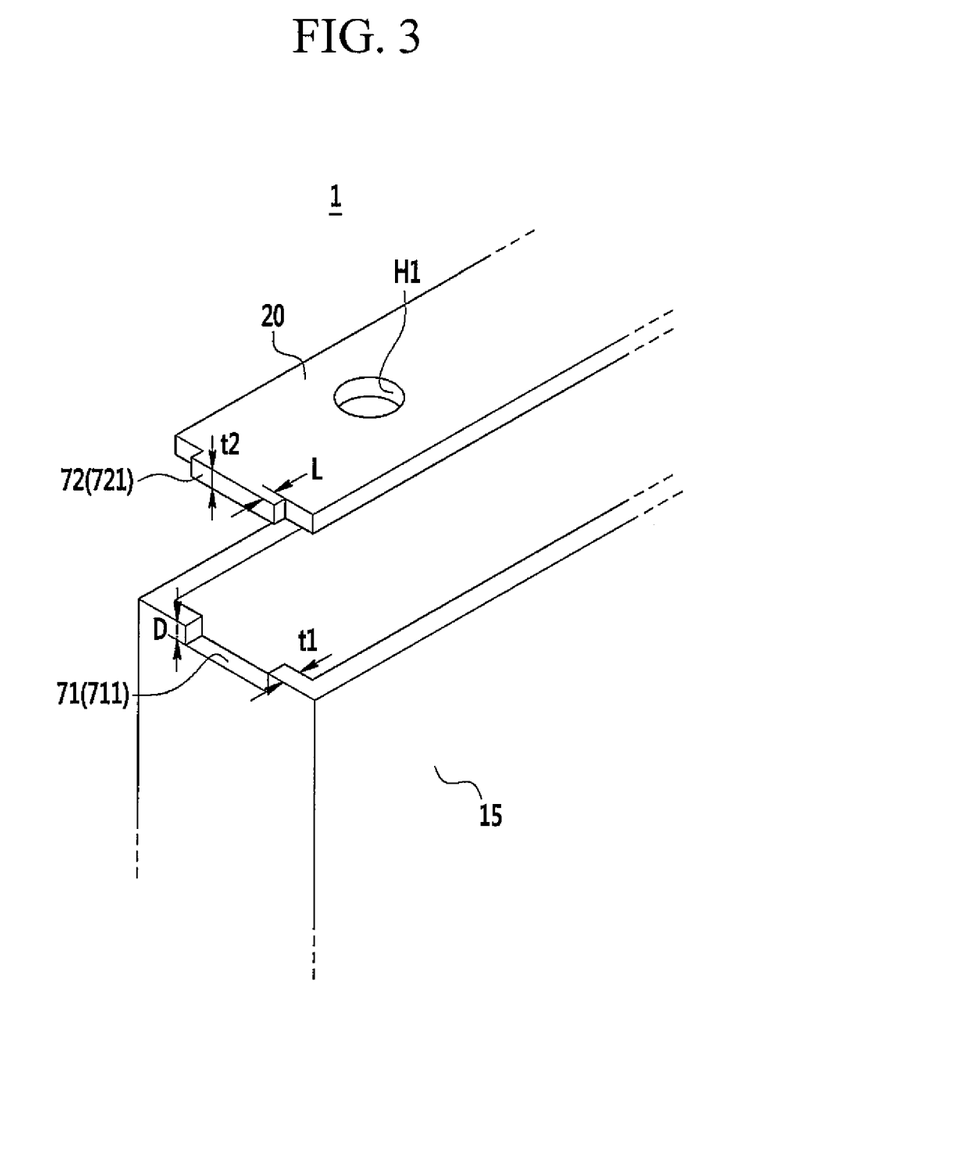
FIG. 3 is an exploded, partial perspective view of a case and a cap plate of FIG. 1.
Figure 4:
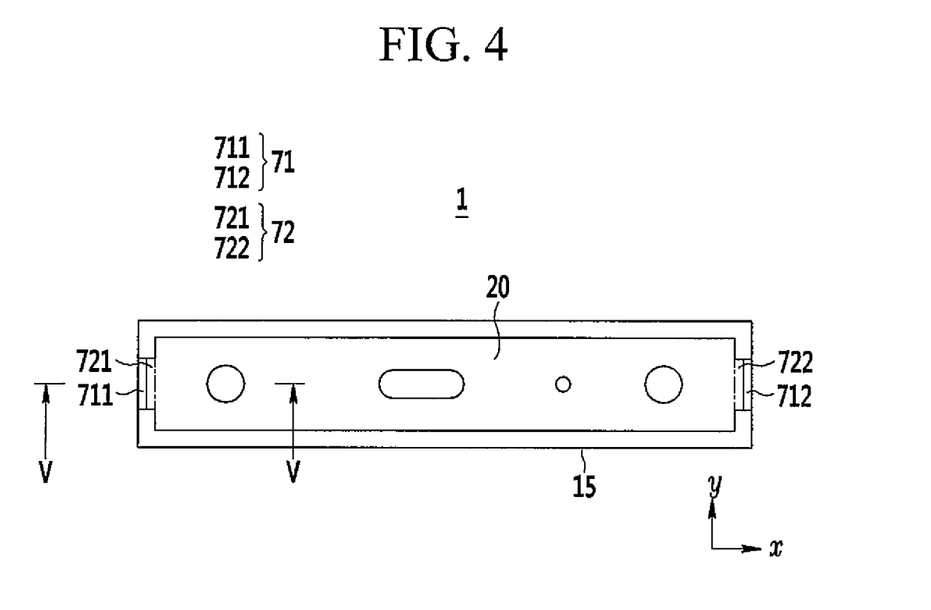
FIG. 4 is a top plan view showing the cap plate coupled to the case of FIG. 3.
Figure 5:
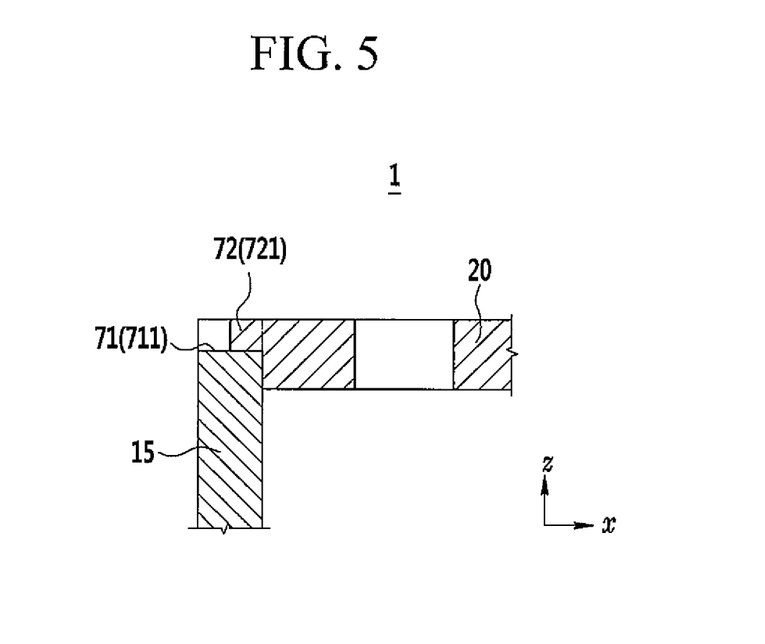
FIG. 5 is a cross-sectional view taken along the line V-V of FIG. 4.

FIG. 3 is an exploded partial perspective view of the case and the cap plate of FIG. 1. FIG. 4 is a top plan view showing that the cap plate is coupled with the case of FIG. 3. FIG. 5 is a cross-sectional view taken along the line V-V of FIG. 4.

Referring to FIGS. 3 to 5, the groove unit 71 is formed in the opening of the case 15, and the protrusion unit 72 is formed on the external circumference of the cap plate 20.

In the illustrated embodiment, a protrusion length L of the protrusion unit 72 is smaller than a thickness t1 of the groove unit 71. Accordingly, when the cap plate 20 is provided in the opening of the case 15 and the protrusion unit 72 is seated in the groove unit 71, a portion of the groove unit 71 is exposed to the outside of the protrusion unit 72 (i.e., a portion of the groove unit 71 is not covered by the protrusion unit 72). Accordingly, the groove unit 71 facilitates safe seating of the protrusion unit 72 and also facilitates welding of the cap plate 20 to the case 15, as described in more detail below.

In one embodiment, a thickness t2 of the protrusion unit 72 is the same as a depth D of the groove unit 71. Accordingly, an upper surface of the protrusion unit 72 and an upper surface of the case 15 form a flat surface. In other words, when the protrusion unit 72 and the groove unit 71 are coupled to each other, the protrusion unit 72 and the case 15 form the same flat upper surface to prevent over-insertion of the protrusion unit 72 into the groove unit 71.

In the illustrated embodiment, the protrusion unit 72 has a rectangular cross-section taken along a length direction (x-axis direction) of the cap plate 20 (see FIG. 5). In one or more alternate embodiments, the protrusion unit 72 may have any other suitable shape, such as, for instance, semi-circular. In one embodiment, the cap plate 20 is welded to the case 15 and the protrusion unit 72 is melted during welding. Therefore, the welding bead 40 formed along the joint between the protrusion unit 72 and the groove unit 71 may have a relatively large area.

In the illustrated embodiment, the opening of the case 15 and the cap plate 20 are both rectangular, and thus they each have a pair of long sides and a pair of short sides. In one embodiment, the groove unit 71 includes a first groove 711 and a second groove 712 formed in a pair of short sides in the opening of the case 15. Additionally, in one embodiment, the protrusion unit 72 includes a first protrusion 721 and a second protrusion 722 coupled to the first groove 711 and the second groove 712, respectively, in the cap plate 20.

Coupling the first groove 711 to the first protrusion 721 and coupling the second groove 712 to the second protrusion 722 couples the cap plate 20 to the opening of the case 15 and prevents over-insertion of the cap plate 20 into the opening. Further, in the illustrated embodiment, the cap plate 20 and the case 15 are coupled to each other at both sides in the x-axis direction. Coupling the cap plate 20 to the case 15 along opposite sides is configured to ensure a balanced and stable connection between the cap plate 20 and the case 15. It will be appreciated, however, that in one or more alternate embodiments the protrusion unit 72 and the groove unit 71 may be located in various positions and configurations on the cap plate 20 and the case 15. Additionally, in one or more embodiments, the cap plate 20 may include a single protrusion 721 and the case 15 may include a single corresponding groove 711.

Figure 6:
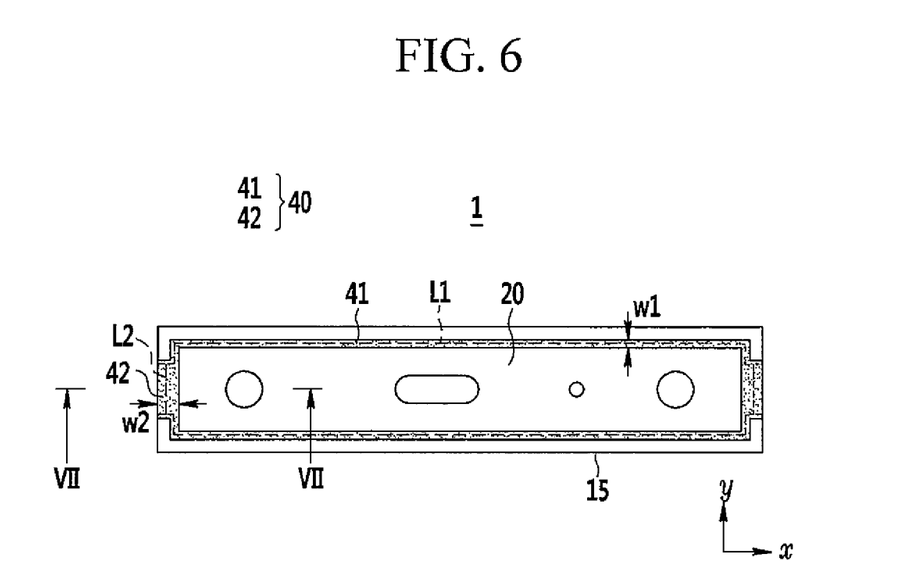
FIG. 6 is a top plan view showing the cap plate iwelded to the case of FIG. 4.
Figure 7:
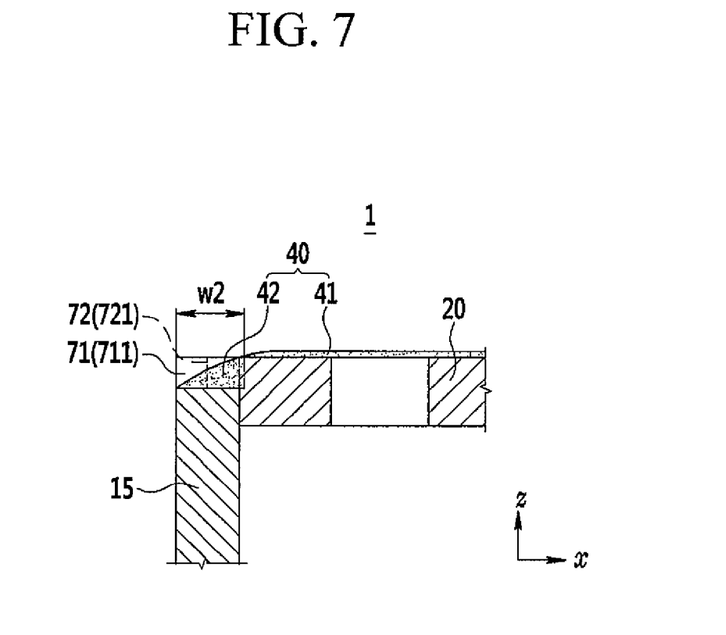
FIG. 7 is a cross-sectional view taken along the line VII-VII of FIG. 6.

FIG. 6 is a top plan view showing the cap plate welded to the case of FIG. 4. FIG. 7 is a cross-sectional view taken along the line VII-VII of FIG. 6. Referring to FIGS. 6 and 7, when the cap plate 20 is welded to the case 15, the welding bead 40 is formed along a first joint L1 and a second joint L2 formed by bringing the internal circumference of the case 15 and the external circumference of the cap plate 20 into contact with each other.

In the illustrated embodiment, the welding bead 40 includes a first bead 41 of a first line width W1 and a second bead 42 of a second line width W2. The second bead 42 is formed to correspond to the groove unit 71 and the protrusion unit 72 in the pair of short sides of the case 15 and the cap plate 20. The first bead 41 is formed along a remaining portion of the interface between the cap plate 20 and the case 15 that is not defined by the engagement between the groove unit 71 and the protrusion unit 73. In the illustrated embodiment, the first bead 41 extends along both the pair of short sides and the pair of long sides of the cap plate 20 and the case 15.

That is, the first bead 41 is formed along the first joint L1 at which the cap plate 20 and the case 15 are in contact with each other when the cap plate 20 is inserted into the case 15. The second bead 42 is formed along the second joint L2 at which the protrusion unit 72 is in contact with the groove unit 71.

The second line width W2 of the second bead 42 includes a portion where the protrusion unit 72 is melted. Accordingly, in the illustrated embodiment, the second line width W2 is larger than the first line width W1. Thus, the second bead 42 where the protrusion unit 72 is melted may increase the weld strength along the joint L2 between the groove unit 71 of the case 15 and the protrusion unit 72 of the cap plate 20.

Hereinafter, various exemplary embodiments of the present invention will be described. A description of those components and/or features that are the same as the first exemplary embodiment and the aforementioned exemplary embodiment will be omitted to avoid redundancy, and only the different components and/or features will be described.

Figure 8:
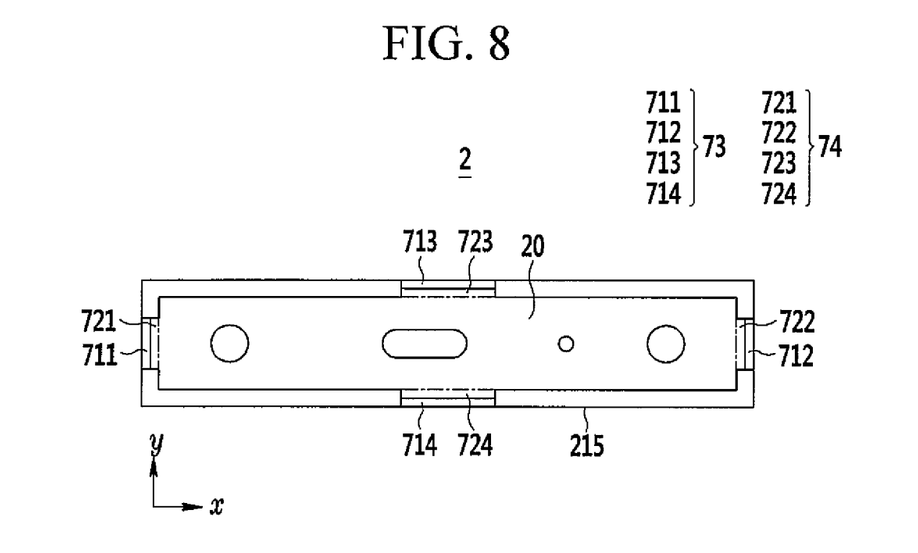
FIG. 8 is a top plan view showing a cap plate coupled to a case of a rechargeable battery according to a second exemplary embodiment of the present invention.
Figure 9:
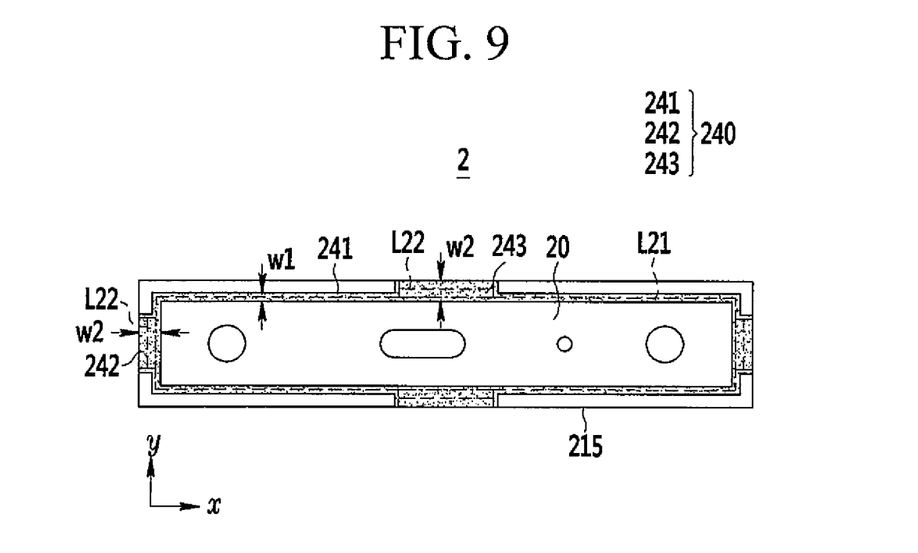
FIG. 9 is a top plan view showing the cap plate welded to the case of FIG. 8.

FIG. 8 is a top plan view showing a cap plate coupled to a case of a rechargeable battery according to a second exemplary embodiment of the present invention. FIG. 9 is a top plan view showing the cap plate welded to the case of FIG. 8.

Referring to FIGS. 8 and 9, in a rechargeable battery 2 according to the second exemplary embodiment, a groove unit 73 of a case 215 includes a first groove 711 and a second groove 712 formed in a pair of short sides of the case 215, and a third groove 713 and a fourth groove 714 formed in a pair of long sides of the case 215.

A protrusion unit 74 of a cap plate 220 includes a first protrusion 721 and a second protrusion 722 coupled to the first groove 711 and the second groove 712, respectively, and a third protrusion 723 and a fourth protrusion 724 coupled to the third groove 713 and the fourth groove 714, respectively.

Coupling the first groove 711 to the first protrusion 721, coupling the second groove 712 to the second protrusion 722, coupling the third groove 713 to the third protrusion 723, and coupling the fourth groove 714 to the fourth protrusion 724 couples the cap plate 220 to an opening of the case 215 and prevents over-insertion of the cap plate 220 into the opening. Further, the cap plate 220 and the case 215 are coupled to each other at both sides in an x-axis direction and at both sides in a y-axis direction. Accordingly, coupling the case 215 and the cap plate 220 at both sides in the x-axis direction and at both sides in the y-axis direction is configured to ensure a balanced and stable connection between the cap plate 220 and the case 215.

A welding bead 240 coupling the cap plate 220 to the case 215 includes first beads 241 of a first line width W1 and second beads 242 and 243 of a second line width W2.

The second beads 242 are formed to correspond to the first groove 711 and the first protrusion 721, and the second groove 712 and the second protrusion 722 in a pair of short sides of the cap plate 220 and the case 215. The second beads 243 are formed to correspond to the third groove 713 and the third protrusion 723, and the fourth groove 714 and the fourth protrusion 724 in a pair of long sides of the cap plate 220 and the case 215. The first bead 241 is formed along a remaining portion of the interface between cap plate 220 and the case 215 that is not defined by the engagement between the groove unit 73 and the protrusion unit 74. In the illustrated embodiment, the first bead 241 extends along both a pair of long sides and a pair of short sides of the cap plate 220 and the case 215.

The first bead 241 is formed along a first joint L21 along which the cap plate 220 and the case 215 are in contact with each other when the cap plate 220 is inserted into the case 215. The second beads 242 and 243 are formed along a second joint L22 along which the protrusion unit 74 is in contact with the groove unit 73.

The second line width W2 of the second beads 242 and 243 includes a portion where the protrusion unit 74 is melted. Accordingly, the second line width W2 is larger than the first line width W1. Thus, the second beads 242 and 243 where the protrusion unit 74 is melted may increase the weld strength along the joints L22 between the groove unit 73 of the case 215 and the protrusion unit 74 of the cap plate 220.

Figure 10:
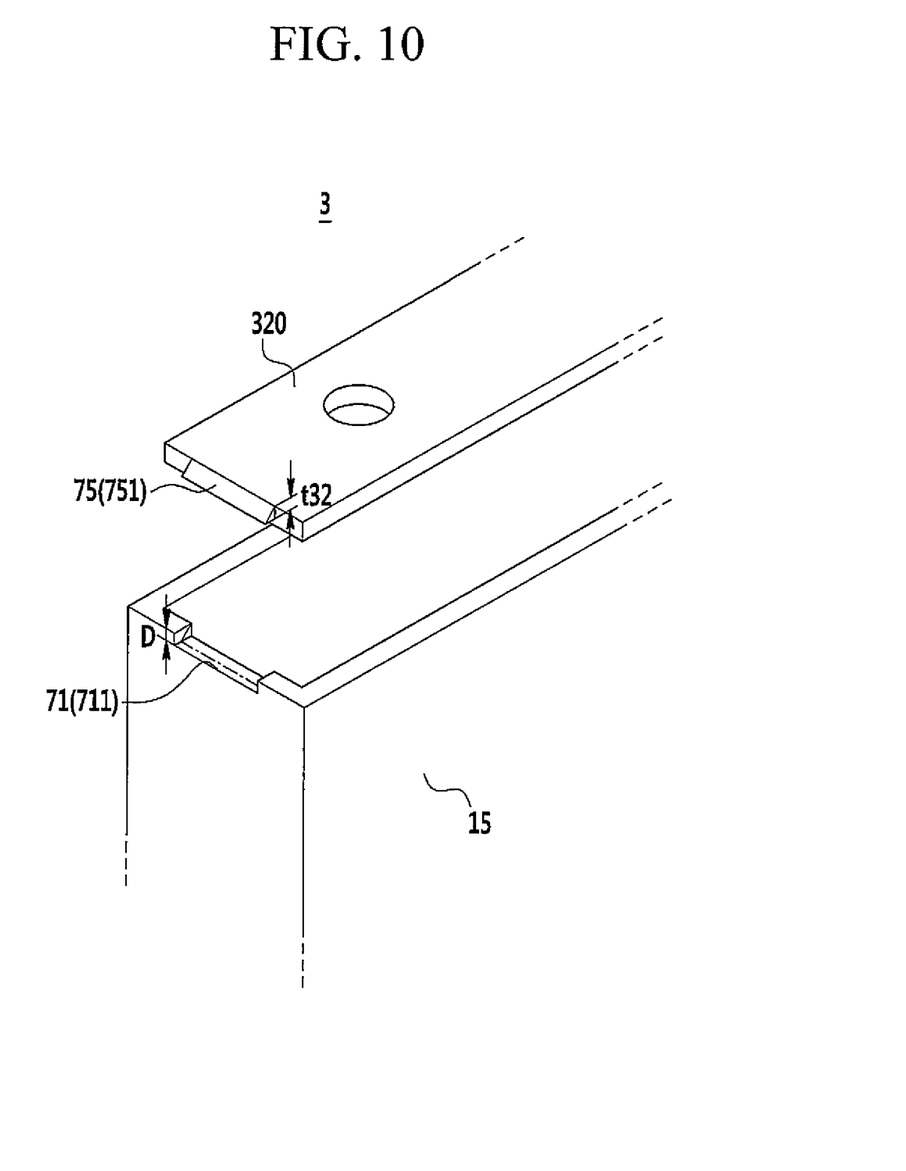
FIG. 10 is an exploded, partial perspective view of a case and a cap plate of a rechargeable battery according to a third exemplary embodiment of the present invention.
Figure 11:
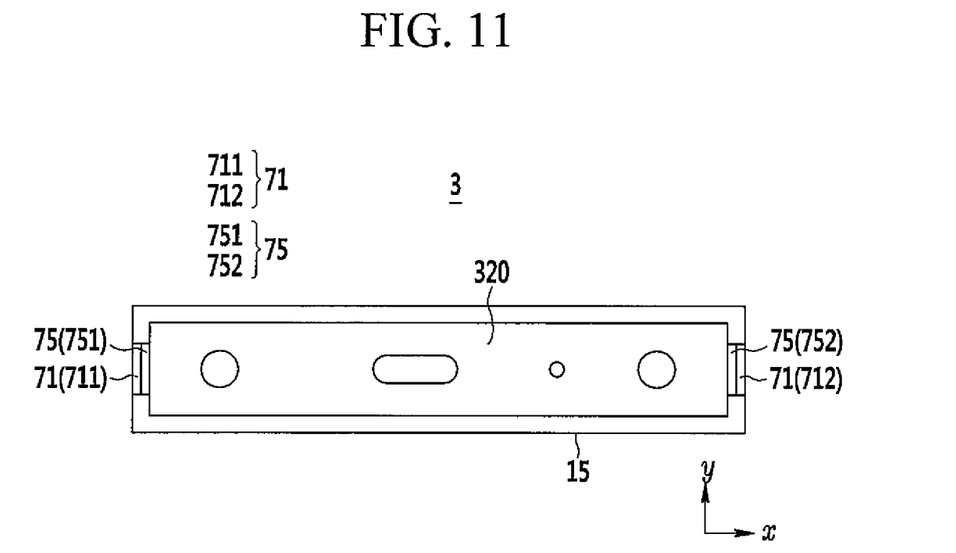
FIG. 11 is a top plan view showing the cap plate coupled to the case of FIG. 10.
Figure 12:
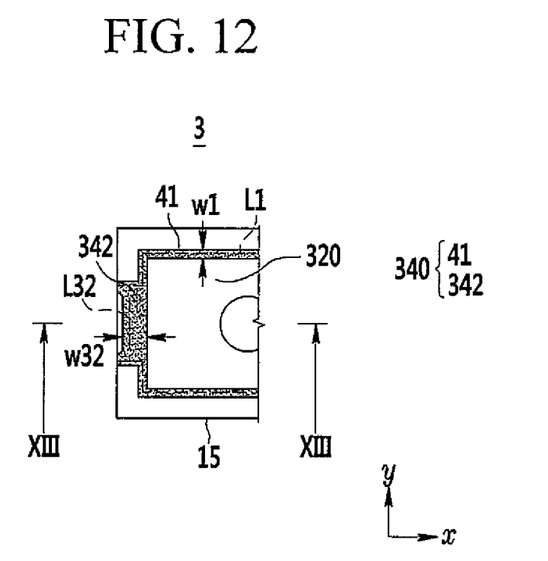
FIG. 12 is a partial top plan view showing the cap plate welded to the case of FIG. 11.
Figure 13:
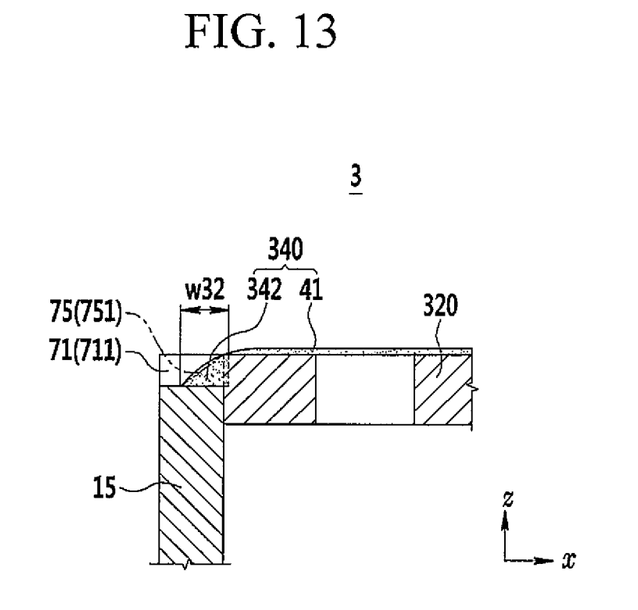
FIG. 13 is a cross-sectional view taken along the line XIII-XIII of FIG. 12.

FIG. 10 is an exploded partial perspective view of a case and a cap plate of a rechargeable battery according to a third exemplary embodiment of the present invention. FIG. 11 is a top plan view showing the cap plate coupled to the case of FIG. 10. FIG. 12 is a top plan view showing the cap plate welded to the case of FIG. 11. FIG. 13 is a cross-sectional view taken along the line XIII-XIII of FIG. 12.

Referring to FIGS. 11 to 13, in a rechargeable battery 3 according to the third exemplary embodiment, a thickness t32 of a protrusion unit 75 of a cap plate 320 is the same as a depth D of the groove unit 71 and then gradually reduced. In other words, the protrusion unit 75 is thick at a side adjacent to the cap plate 320, and the thickness is decreased away from the cap plate 320 (i.e., the protrusion unit 75 tapers between a thicker inner portion and a thinner outer portion). In the illustrated embodiment, the protrusion unit 75 has a right triangular cross-section along a length direction (x-axis direction) of the cap plate 320.

The protrusion unit 75 of the cap plate 320 includes a first protrusion 751 and a second protrusion 752 coupled to the first groove 711 and the second groove 712, respectively. Coupling the first groove 711 to the first protrusion 751 and coupling the second groove 712 to the second protrusion 752 couples the cap plate 320 to the opening of the case 15 and prevents over-insertion of the cap plate 320 into the opening. Further, the cap plate 320 and the case 15 are coupled with each other at both sides in the x-axis direction. Accordingly, coupling the case 15 to the cap plate 320 at both sides in the x-axis direction is configured to ensure a balanced and stable connection between the cap plate 320 and the case 15.

In the embodiment illustrated in FIG. 12, a welding bead 340 coupling the cap plate 320 to the case 15 includes the first bead 41 of the first line width W1 and a second bead 342 of a second line width W32. The second bead 342 is formed to correspond to the groove unit 71 and the protrusion unit 75 in a pair of short sides of the cap plate 320 and the case 15. The first bead 41 is formed along a remaining portion of the interface between the cap plate 320 and the case 15 that is not defined by the engagement between the groove unit 71 and the protrusion unit 75. In the illustrated embodiment, the first bead 341 extends along both a pair of long sides and a pair of short sides of the cap plate 320 and the case 15.

The first bead 41 is formed along the first joint L1 along which the cap plate 320 and the case 15 are in contact with each other when the cap plate 320 is inserted into the case 15. The second bead 342 is formed along a second joint L32 along which the protrusion unit 75 is in contact with the groove unit 71.

The second line width W32 of the second bead 342 includes a portion where the protrusion unit 75 is melted. Accordingly, the second line width W32 is larger than the first line width W1. Thus, the second bead 342 where the protrusion unit 75 is melted may increase the weld strength along the joint L32 between the groove unit 71 of the case 15 and the protrusion unit 75 of the cap plate 20.

Figure 14:
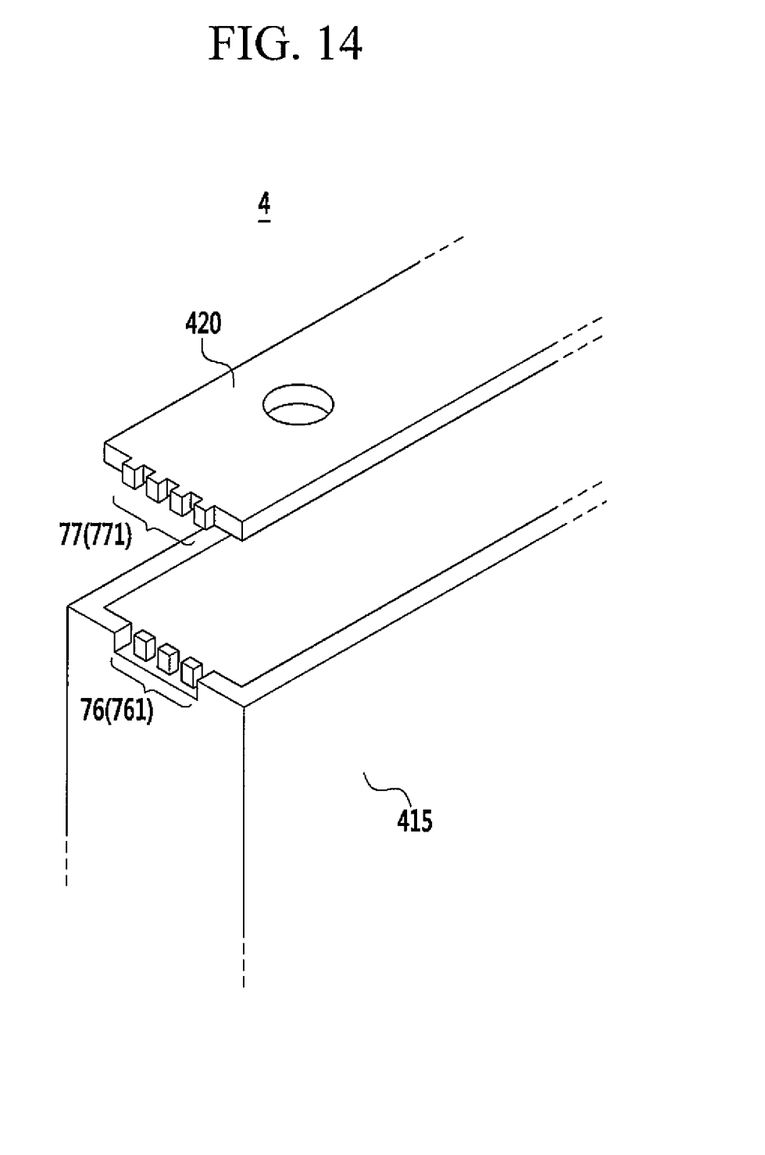
FIG. 14 is an exploded, partial perspective view of a case and a cap plate of a rechargeable battery according to a fourth exemplary embodiment of the present invention.
Figure 15:
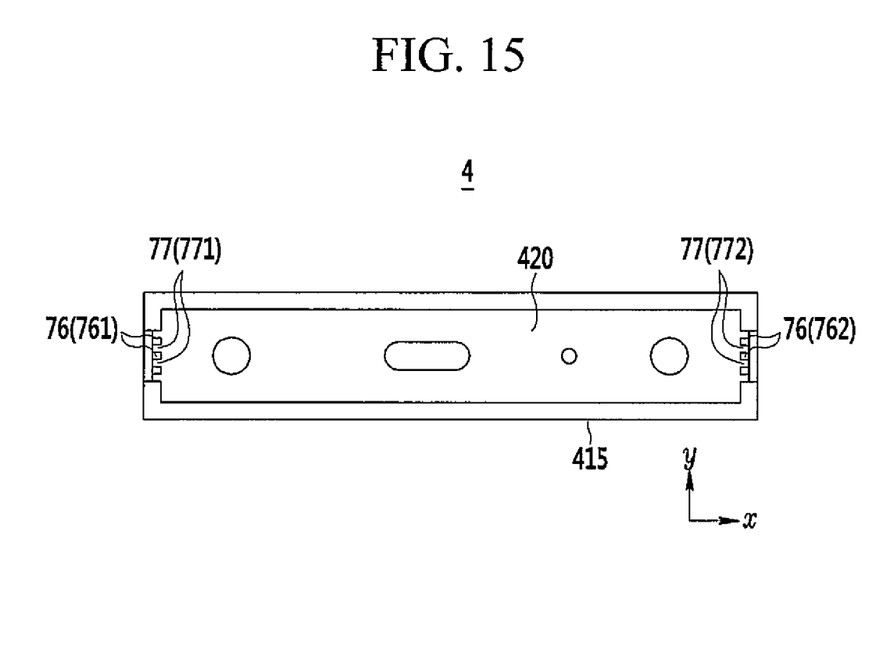
FIG. 15 is a top plan view showing the cap plate coupled to the case of FIG. 14.
Figure 16:
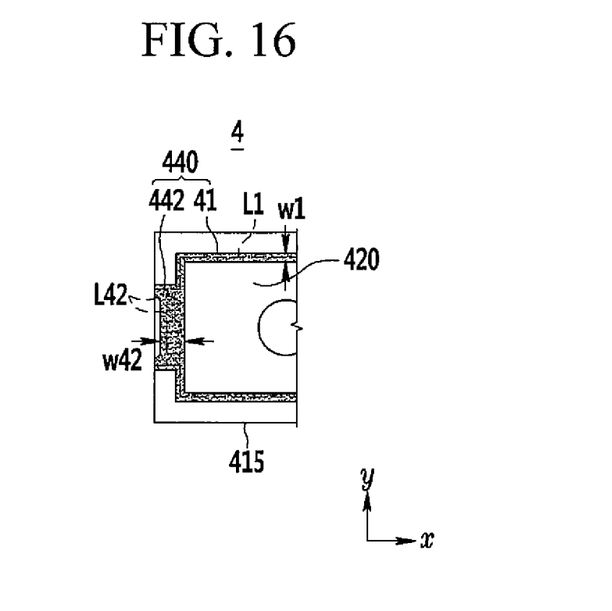
FIG. 16 is a partial top plan view showing the cap plate welded to the case of FIG. 15.

FIG. 14 is an exploded partial perspective view of a case and a cap plate of a rechargeable battery according to a fourth exemplary embodiment of the present invention. FIG. 15 is a top plan view showing the cap plate coupled with the case of FIG. 14. FIG. 16 is a top plan view showing the cap plate welded to the case of FIG. 15.

Referring to FIGS. 14 to 16, in a rechargeable battery 4 according to the fourth exemplary embodiment, a groove unit 76 of a case 415 includes a plurality of grooves and protrusions. A protrusion unit 77 of a cap plate 420 includes a plurality of protrusions and grooves corresponding to the plurality of grooves and protrusions of the groove unit 76. The protrusion unit 77 of the cap plate 420 is coupled to the groove unit 76 of the case 415.

The groove unit 76 and the protrusion unit 77 include first and second groove units 761 and 762 and first and second protrusion units 771 and 772, respectively, formed in a pair of short sides of the case 415 and the cap plate 420. Although in the illustrated embodiment the cap plate 420 and an opening in the case 415 are rectangular, in one or more alternate embodiments, the cap plate 420 and the opening in the case 415 may have any other suitable shape, such as, for instance, circular. Although not shown in the drawings, in one or more alternate embodiments, the groove unit and the protrusion unit may be formed in a pair of long sides or in both a pair of long sides and a pair of short sides of the case and the cap plate.

Coupling the first groove unit 761 to the first protrusion unit 771 and coupling the second groove unit 762 to the second protrusion unit 772 couples the cap plate 420 to the opening of the case 415 and prevents over-insertion of the cap plate 420 into the opening. Further, the cap plate 420 and the case 415 are coupled with each other at both sides in the x-axis direction. Accordingly, coupling the case 415 to the cap plate 420 at both sides in the x-axis direction is configured to ensure a balanced and stable connection between the cap plate 420 and the case 415.

The welding bead 440 coupling the cap plate 420 to the case 415 includes the first bead 41 of the first line width W1 and a second bead 442 of a second line width W22. In the illustrated embodiment, the first bead 41 is formed in a pair of long sides of the cap plate 420 and the case 415. The second bead 442 is formed to correspond to the first groove unit 761 and the first protrusion unit 771) and the second groove unit 762 and the second protrusion unit 772 in a pair of short sides of the cap plate 420 and the case 415.

The first bead 41 is formed along the first joint L1 along which the cap plate 420 and the case 415 are in contact with each other when the cap plate 420 is inserted into the case 415. The second bead 442 is formed along a second joint L42 along which the protrusion unit 77 is in contact with the groove unit 76.

The second line width W42 of the second bead 442 includes a portion where the protrusion unit 77 and the groove unit 76 are melted. Accordingly, the second line width W42 is larger than the first line width W1. Thus, the second bead 442 where the protrusion unit 77 and the groove unit 76 are melted may increase the weld strength along the joint L42 between the groove unit 76 of the case 415 and the protrusion unit 77 of the cap plate 420.

While this invention has been described in connection with what is presently considered to be practical exemplary embodiments, it is to be understood that the invention is not limited to the disclosed embodiments, but, on the contrary, is intended to cover various modifications and equivalent arrangements included within the scope of the appended claims, the detailed description of the invention, and the drawings.

What is claimed is:

1. A rechargeable battery unit comprising:
an electrode assembly comprising a first electrode, a second electrode, and a separator between the first electrode and the second electrode;
a case accommodating the electrode assembly, wherein the case includes an opening in a first end of the case and at least one groove in the first end of the case;
a cap plate coupled to the first end of the case closing the opening, wherein
the cap plate has an inner side facing the electrode assembly, an outer side opposite the inner side, and lateral sides between the inner and the outer side, and with two long and two short lateral sides, and wherein
the cap plate includes at least one protrusion accommodated in the at least one groove in the case, the protrusion projecting from one of the lateral sides and parallel to the inner side; and
a weld bead comprising:
a first weld bead extending along the at least one groove and the at least one protrusion; and
a second weld bead extending along a remainder of a joint between the cap plate and the case.

2. The rechargeable battery unit of claim 1, wherein the cap plate includes two shorter sides and two longer sides.

3. The rechargeable battery unit of claim 2, wherein the cap plate is rectangular or trapezoidal.

4. The rechargeable battery unit of claim 1, wherein a length of the at least one protrusion is less than a thickness of the at least one groove.

5. The rechargeable battery unit of claim 1, wherein the at least one protrusion has a rectangular cross-section.

6. The rechargeable battery unit of claim 1, wherein the weld bead extends continuously around a circumference of the cap plate.

7. The rechargeable battery unit of claim 1, wherein a width of the first weld bead is greater than a width of the second weld bead.

8. The rechargeable battery unit of claim 1, wherein the first weld bead includes a portion of the at least one protrusion on the cap plate.

9. The rechargeable battery unit of claim 1, wherein the at least one protrusion is tapered between a thicker inner portion and a thinner outer portion.

10. The rechargeable battery unit of claim 1 comprising:
   a plurality of protrusions extending from one edge of the cap plate; and
   a plurality of grooves in the first end of the case, wherein each one of the plurality of protrusions in the cap plate is received in a respective one of the plurality of grooves in the case.

11. The rechargeable battery unit of claim 1 further comprising:
   a first electrode terminal coupled to the cap plate and electrically coupled to the first electrode;
   a second electrode terminal coupled to the cap plate and electrically coupled to the second electrode.

12. The rechargeable battery unit of claim 1, wherein the cap plate further comprises:
   a vent hole; and
   a vent plate covering the vent hole.

13. The rechargeable battery unit of claim 1, wherein a first end and a second end of the cap plate are asymmetric with respect to each other.

14. The rechargeable battery unit of claim 13, wherein a first portion of the case coupled to the first end of the cap plate and a second portion of the case coupled to the second end of the cap plate are asymmetric with respect to each other.

\* \* \* \* \*